Figure 1:
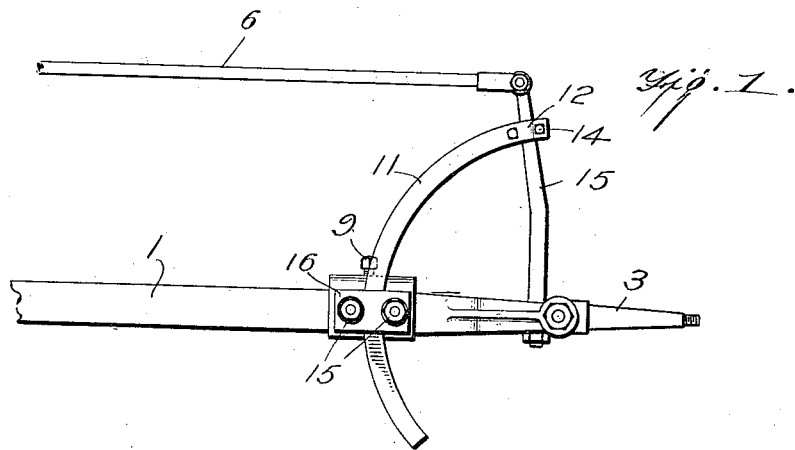

H. L. SCHULER.
ATTACHMENT FOR STEERING MECHANISM OF MOTOR DRIVEN VEHICLES.
APPLICATION FILED MAR. 29, 1920.

1,375,419.

Patented Apr. 19, 1921.

Inventor
HARRY L. SCHULER,
By Watson E. Coleman
Attorney

UNITED STATES PATENT OFFICE.

HARRY L. SCHULER, OF BLOOMINGTON, ILLINOIS.

ATTACHMENT FOR STEERING MECHANISM OF MOTOR-DRIVEN VEHICLES.

1,375,419.   Specification of Letters Patent.   Patented Apr. 19, 1921.

Application filed March 29, 1920. Serial No. 369,669.

*To all whom it may concern:*

Be it known that I, HARRY L. SCHULER, a citizen of the United States, residing at Bloomington, in the county of McLean and State of Illinois, have invented certain new and useful Improvements in Attachments for Steering Mechanism of Motor-Driven Vehicles, of which the following is a specification, reference being had to the accompanying drawings.

This invention relates to an improved friction attachment for use in connection with steering mechanisms of motor driven vehicles, preferably steering mechanisms of Ford automobiles, and an object of the invention is to provide a device of this character designed primarily for holding the front wheels in the positions in which they may be set, either straight ahead or slightly to one side or the other.

A further object involves a device of this kind, which when applied to the steering mechanism of a motor driven vehicle avoids the necessity of the chauffeur holding the steering wheel under rigid control at all times, so that should the front wheels strike an obstruction on the side which would tend to deflect them to one side or the other, the wheels are prevented from turning, and traveling to one side of the road bed. In other words, by the provision of a device of this kind, the front wheels are prevented from accidentally turning to the side and "ditching" the vehicle.

A further object consists in the provision of a supported guide on the front axle of the vehicle, and an element connected to an arm of the steering knuckle, and operatively engaging the supported guide, which is provided with tensioned friction means to coöperate with the element so as to hold the front wheels in the positions they may assume when set.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

Figure 2:
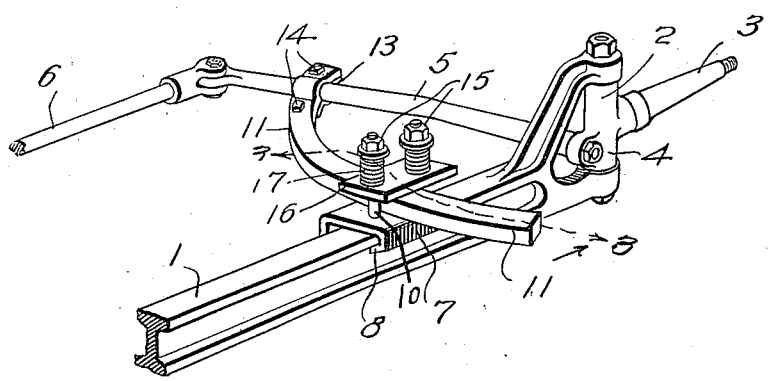
Figure 3:
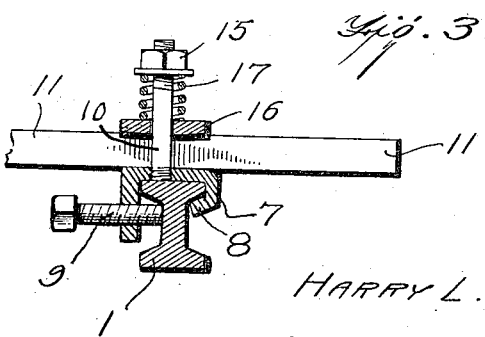

In the drawings:

Figure 1 is a plan view of the front axle of a motor driven vehicle, showing the usual knuckle connections between the front axle and the spindles for the front wheels and illustrating the embodiment of the invention thereto, Fig. 2 is a perspective view of one end of the front axle showing the improved friction attachment as applied; and Fig. 3 is a sectional view on line 3—3 of Fig. 2.

Referring more especially to the drawings, 1 designates the usual form of front axle, which is provided with knuckle joints 2 with the spindles 3 on which the front wheels of the motor driven vehicle operates. Projecting rearwardly from the hub bodies 4 of the knuckle joints are arms 5; and 6 denotes a connecting rod, connecting the arms 5.

A U-shaped clamp 7 arches the front axle of the motor driven vehicle, and one of the arms of the clamp is provided with a right angle extending lug 8 which engages under a flange of the axle assisting in reinforcing and supporting the clamp in position. A set bolt 9 is threaded through the other arm of the clamp, and bears frictionally against one side of the axle 1, thereby holding the clamp securely and rigidly in position. Rising upwardly from each clamp is a pair of upstanding pins or guide arms 10, between which an arcuate friction bar 11 operates. This friction bar is curved on the arc of a circle whose radius extends from the hub body of the knuckle joint. The friction bars have clamps 12, which arch the rearwardly extending arms of the hub bodies of the knuckle joints, there being additional clamps 13 arching under the arms 5, and secured to the clamps 12 by suitable bolts or the like 14. By means of the clamps 12 and 13, the friction bars are held securely to the arms 5 in fixed relative positions thereto. As previously stated, the arcuate friction bars 11 engage between the upstanding pins or arms 10 and are guided thereby. Threaded upon the upper ends of the pins or arms 10 are adjustable nuts 15 between which and a friction plate 16, heavy tensioned coil springs 17 are interposed. These coil springs are carried by the pins or arms 10 and act to bear with sufficient tension upon the friction plate 16, to hold the plate in frictional contact with the bar 11. The under face 18 of the friction plate 16 is arcuately curved as shown, and is designed to bear frictionally upon the bar 11. It will be noted that the friction between the under surface of the plate 16 and the bar 11 can be increased or decreased by regulating the tension of the coil springs 17, namely by adjusting the nuts 15. It will be observed that by the provision of the arcuate bars 11 having frictional contact with the upper face of the clamps 7 and the friction plate 16, the rearwardly extending arms 5 may be held substantially in positions which they may assume when setting the steering wheel, thereby holding the front wheels of the motor driven vehicle so that their limit of travel will not be accidentally changed to any great degree by contacting with the irregularities or obstructions in the road bed. In this way accidents, such as heretofore occurred owing to the accidental turning of the front wheels when control of the steering wheel has been lost, are eliminated. It will be noted that the pins 10 are spaced apart equal to the width of the arcuate arm or bar 11, thereby guiding the arcuate bar and preventing excessive movement thereof sidewise, and at the same time relieving strain thereon, and on the rearwardly extending arm 5.

The invention having been set forth, what is claimed as new and useful is:—

1. The combination with a front axle of a motor driven vehicle having a knuckle joint, of a rearwardly extending arm on the hub body of the joint, a friction device carried by the axle, an arcuate element carried by the rearwardly extending arm of the hub body of the knuckle and operatively engaging with said friction device for frictionally holding the arm in the position in which it is set, said friction device including means between which the arcuate element engages to prevent excessive movement of the arcuate element sidewise, thereby relieving strain on the element and the rearwardly extending arm.

2. In a device as set forth, a front axle of a motor driven vehicle provided with a knuckle joint, a friction device detachably mounted upon the axle and having means to insure a constant friction, an arm extending rearwardly from the hub body of said joint, and an arcuate element carried by the arm and being curved on a radius extending from the knuckle joint, said arcuate element engaging the friction device whereby said means may offer a constant friction thereon to hold the arm in the position in which it may be set.

In testimony whereof I hereunto affix my signature.

HARRY L. SCHULER.